United States Patent [19]

Levatter et al.

[11] 4,005,374
[45] Jan. 25, 1977

[54] PULSED GAS LASER WITH LOW-INDUCTANCE FLOW-THROUGH ELECTRODES

[75] Inventors: Jeffrey I. Levatter, Palo Alto; Shao-Chi Lin, La Jolla, both of Calif.

[73] Assignee: Xonics, Inc., Van Nuys, Calif.

[22] Filed: Mar. 31, 1975

[21] Appl. No.: 563,713

[52] U.S. Cl. .................. 331/94.5 PE; 331/94.5 G; 330/4.3
[51] Int. Cl.² ..................... H01S 3/097; H01S 3/22
[58] Field of Search ............... 331/94.5 R, 94.5 PE, 331/94.5 G; 330/4.3

[56] References Cited
UNITED STATES PATENTS

| | | |
|---|---|---|
| 3,721,915 | 3/1973 | Reilly .......................... 331/94.5 PE |
| 3,875,531 | 4/1975 | Buczek et al. ................. 331/94.5 G |

OTHER PUBLICATIONS

Wood, O. R., Proceedings of the IEEE, vol. 62, No. 3, Mar. 20, 1974, pp. 355–357.

Primary Examiner—Robert J. Webster
Attorney, Agent, or Firm—Harris, Kern, Wallen & Tinsley

[57] ABSTRACT

An electrically pumped gas laser with an electrode assembly providing for gas flow through spaced upstream and downstream electrode arrays with the flow path perpendicular to the optical axis of the laser in a very low inductance electrical circuit. Electrode arrays comprising parallel spaced blade shaped electrodes, with the upstream electrodes having a contoured leading edge and a trailing knife edge spaced from the walls of the discharge space, and with the downstream electrodes having a leading knife edge spaced from the walls of the discharge space and a similarly contoured trailing edge. An electrode assembly with upstream and downstream gas flow channels providing a double parallel plate transmission line for electrical connections and energy storage, with the channel walls serving either directly or as supporting structures for the inner plates, and with the outer plates in the form of conducting sheets spaced from the inner plates by insulating sheets.

13 Claims, 5 Drawing Figures

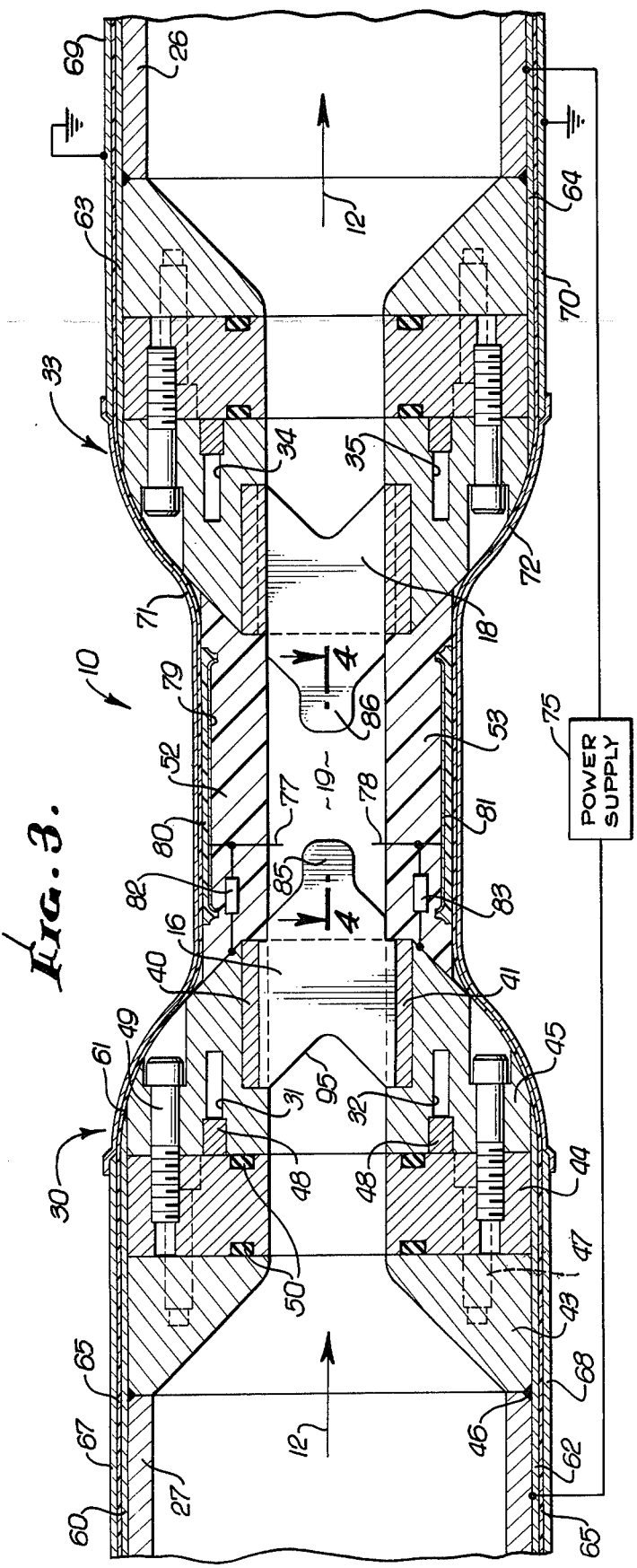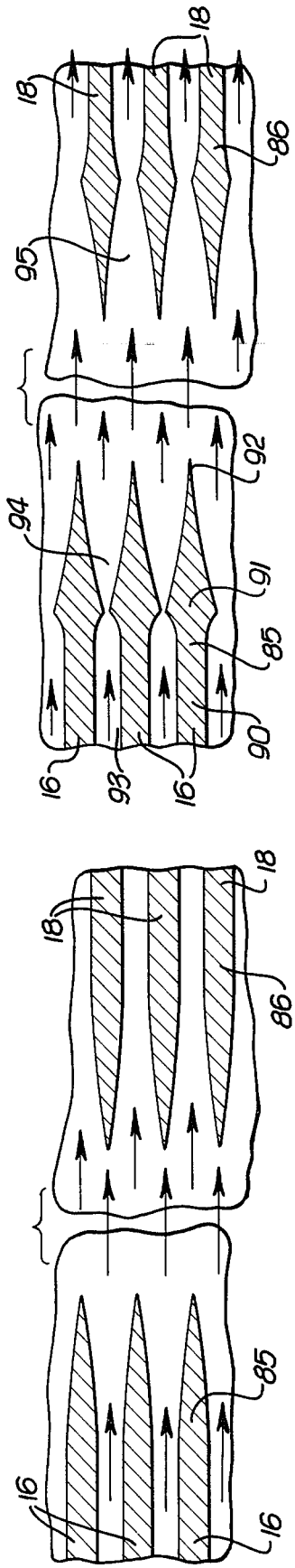

PULSED GAS LASER WITH LOW-INDUCTANCE FLOW-THROUGH ELECTRODES

BACKGROUND OF THE INVENTION

This invention relates to gas lasers and in particular, to a new and improved discharge electrode assembly for rapid gas displacement in a very low inductance electrically pumped gas laser operating in a fast repetitively pulsed mode. The electrode assembly should provide for gas flow control, electrical discharge initiation and maintenance, cooling, and positive displacement of the laser gas across the discharge gap for effective waste product removal. These functions are achieved with the new and unique flow through electrode arrays of the present application.

A flow through electrode array should provide a smooth flow pattern through the discharge gap at very high flow rates and provide rapid removal of the waste discharge product and rapid removal of the waste heat from the laser cavity for operation in high repetition rate, high power pulsed electrical laser applications.

For an important class of pulsed electrical lasers commonly referred to in the literature as "pulsed electrical lasers of the self-terminating type" (G. G. Petrash, "Pulsed Gas-Discharge Lasers," Soviet Physics USPEKHI, Vol. 14, No. 6, May-June, 1972, pp. 747–765), high power and efficient laser generation can only be achieved in very high current but very low inductance electrical discharge circuits since the discharge current rise time and pulse duration must be sufficiently short in comparison with the spontaneous emission life time of the upper laser state so as to avoid premature termination of population inversion (and hence laser action). For electronic transition gas lasers operating in the ultraviolet, visible, and near infrared parts of the electromagnetic spectrum, the spontaneous emission life time of the upper laser state lies typically in the range of $10^{-8}$ to $10^{-7}$ second (that is, one/one hundred millionth to one/ten millionth of a second). To achieve high current electrical discharge with current rise time and pulse duration lying in this range, it is generally necessary to employ a very low inductance electrical energy storage system (capacitors) which is closely coupled to the discharge chamber with good impedance matching. A good example of how such electrical coupling can be achieved through the use of an integrated double-parallel-plates transmission line energy storage/discharge circuit in a high power pulsed nitrogen laser design configuration is given in a recent paper — Jeffrey I. Levatter & Shao-Chi Lin, "High-Power Generation from a Parallel-Plates-Driven Pulsed Nitrogen Laser," Applied Physics Letters, Vol. 25, No. 12, Dec. 15, 1974, pp. 703–705.

Gas lasers have been used with honeycomb electrode configurations for operation at low pressure (typically below 1 torr) in the glow discharge mode. However such electrode configuration is not suitable for operation at moderate to high gas pressures (a few torr and up) above the low gas pressures which correspond to glow discharges, nor for operation in high voltage pulsed modes. Such configuration is also not suitable for adaptation in a high current, very low inductance electrical discharge circuit for efficient generation of pulsed lasers of the self-terminating type as mentioned in the preceding paragraph. In another known device, a plurality of rods or wires is supported parallel to the flow path to serve as electrodes. These wire shaped electrodes provide no flow smoothing and have minimum surface contact with the flowing gas for effective heat transfer and do not permit any electrode shaping for positive control of the electrical discharge current distribution in the high current pulse mode.

None of the known prior art electrode assemblies provide the desired performance and accordingly it is an object of the present invention to provide a new and improved discharge electrode assembly particularly suited for fast electrical rise time, high repetition rate, high power pulsed electrically pumped gas lasers and providing gas flow control with smooth flow patterns, electrical discharge initiation, cooling, and removal of waste products from the laser cavity for maintenance of good laser performance at high pulse repetition rates.

SUMMARY OF THE INVENTION

The discharge electrode assembly of the present invention includes an array of blade shaped upstream electrodes and an array of blade shaped downstream electrodes with the arrays mounted in spaced relation defining the discharge space or discharge chamber therebetween. The discharge space is the laser cavity, with the optical axis of the laser parallel to the two arrays. Each array comprises a plurality of electrodes spaced from each other and in the preferred embodiment, the electrodes have a special configuration. Means are provided for directing a gas flow through the upstream electrode array, through the discharge space between the arrays and through the downstream electrode array, and means are provided for connecting a low inductance electrical pulse source across the arrays. The upstream and downstream gas flow channels or tubes incorporate double parallel plate transmission lines providing low inductance electrical energy storage and efficient electrical coupling to the discharge chamber.

BRIEF DESCRIPTION OF THE DRAWINGS

FIG. 3 is an enlarged view of the electrode structure of the laser of FIG. 2;

FIG. 4 is an enlarged partial sectional view taken along the line 4—4 of FIG. 3 showing a subsonic configuration; and FIG. 5 is a view similar to FIG. 4 showing a supersonic configuration.

DESCRIPTION OF THE PREFERRED EMBODIMENTS

Figure 1:
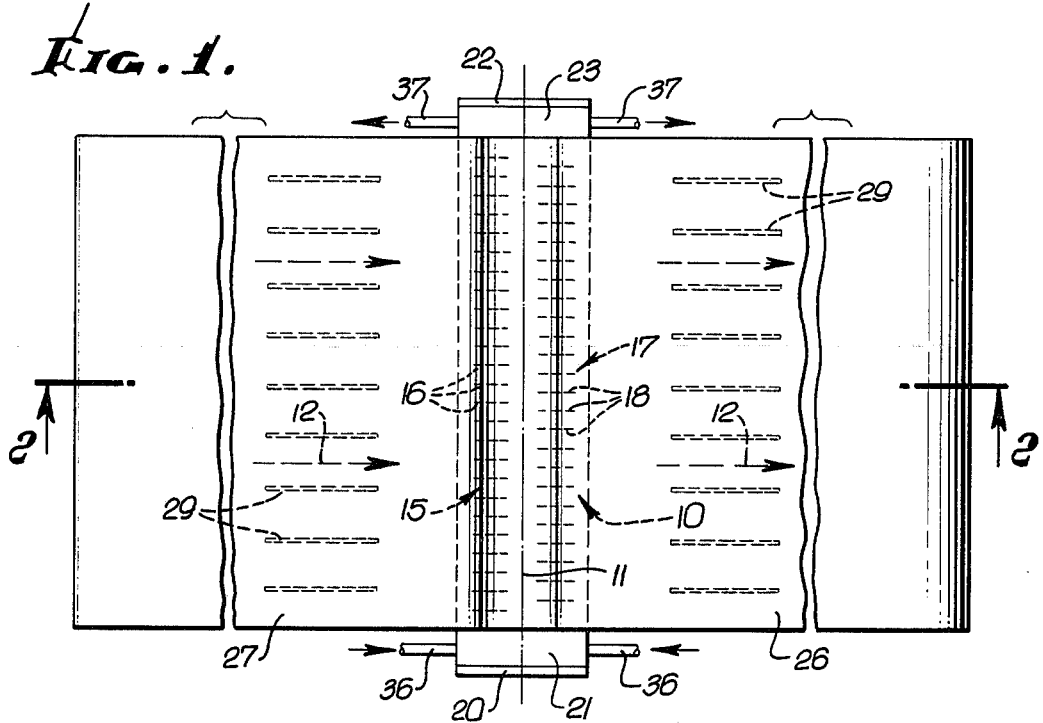
FIG. 1 is a plan view of an electrically pumped gas laser incorporating the presently preferred embodiment of the invention.
Figure 2:
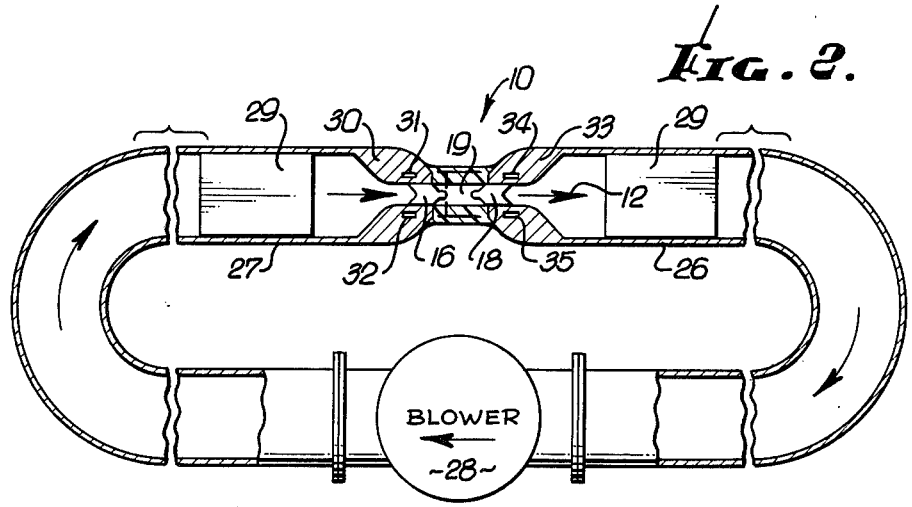
FIG. 2 is a sectional view taken along the line 2—2 of FIG. 1.

FIGS. 1 and 2 illustrate an electrically pumped laser incorporating the discharge electrode assembly 10 of the invention with the laser optical axis 11 perpendicular to the gas flow as indicated by arrows 12. The electrode assembly includes an array 15 of upstream electrodes 16 and an array 17 of downstream electrodes 18, with the arrays spaced from each other providing the discharge chamber 19 therebetween. The ends of the discharge chamber are closed by a mirror 20 carried on end plate 21 and a window or partially transmitting mirror 22 carried on end plate 23. A gas flow path is provided by tubes 26, 27 and a blower 28. The tubes preferably include internal baffles 29 which provide rigidity for the tube walls and a plurality of flow channels through the tubes. The flow path may also include compressors, pumps, metering and/or throttling valves, guide vanes, heat exchangers and the like as desired. The upstream electrodes 16 are mounted in a support structure 30 which may include coolant passages 31, 32. The downstream electrodes 18 are similarly mounted in a support structure 33 with coolant passages 34, 35. Connections to the coolant passages may be made through the end plates 21, 23 with inlet lines 36 and outlet lines 37.

The presently preferred construction for the electrode assembly 10 is shown in greater detail in FIG. 3. The electrodes 16 are flat blades mounted in side by side spaced relation in upper and lower comb shaped support plates 40, 41.

The support structure 30 includes slotted plates 43, 44, 45. The plate 43 is joined to the end of the tube 27, typically by welding at the periphery 46. The plate 43 provides a reduction in cross section area of the flow path from that of the tube 27 to that of the discharge chamber 19. Plate 44 serves as a spacer and may be affixed to the plate 43 by screws 47. The electrode array with support plates 40, 41 is mounted in the plate 45. The coolant passages 31, 32 may be provided in the plate 45 by slots which are closed by plugs 48. The plate 45 is joined to the plate 44 by screws 49. Seals 50 may be provided between the adjacent plates 43, 44, 45 as desired. The support structure 33 may be the same as the support structure 30.

The upper and lower walls of the discharge chamber 19 are defined by insulator plates 52, 53 positioned between the electrode support structures 30, 33. The electrodes 16, 18 preferably are made of a tough durable metal such as molybdenum, tungsten, stainless steel, or beryllium-copper, and the support plates 40, 41, 43, 44 and 45 are made of a good electrical and heat conductor such as copper or aluminum. The tubes 26, 27 typically are aluminum extrusions. A thin copper sheet 60, typically 1 millimeter (~0.05 inches) thick, may be applied over the tube and support structure and connected to the plate 45 as by soldering at 61. Similar sheets 62, 63, 64 may be utilized. An insulating layer 65, typically mylar sheet or sheets, may be applied over the conducting sheets 60, 62, 63, 64, preferably with the insulator continuing from one support structure to the other past the insulator plates 52, 53. Additional copper sheets 67, 68, 69, 70 are positioned over the sheets 60, 62, 63, 64, respectively, with the insulator 65 therebetween. The sheets 67 and 69 may be a single continuous sheet, but preferably are joined by a sheet 71 which is substantially thinner, typically 0.01 inches thick compared to the typical 0.05 inches thick for the sheets 67, 69 for easy compliance to the contoured shape of the support structure 30, 33, and of the insulator plates 52, 53 upon application of suitable clamping pressure. Similarly, the sheets 68, 70 may be joined by a thinner sheet 72. This provides a low inductance electrical energy storage capacitor system which also serves as a double parallel plate transmission line for driving the electrical discharge across the electrodes 16, 18 upon charging up to a high voltage and subsequent switching. An example of how such electrical charging and switching can be accomplished in a particular pulsed nitrogen laser application can be found in the paper by Levatter and Lin.

It is desirable to provide a clamping structure over the sheets 67, 68, 69, 70, 71, 72 so that relatively uniform pressure can be applied to the dielectric sheets of the insulating layer 65 in order to minimize the inductance and maximize the capacitance of the double-parallel-plates transmission line. Such a clamping structure may include upper and lower blocks of an insulating material extending over and projecting beyond the portion shown in FIG. 3, contoured to match the outer sheets, and held together by bolts or other suitable fasteners. Alternatively, the clamping may be effected by hydraulic or pneumatic means, such as inflated rubber bladders placed between some outer supporting structures and the plates 67, 68, 69, 70, 71, 72.

Auxiliary electrodes 77, 78 may be mounted in the insulating plates 52, 53, respectively, with the electrodes projecting into the discharge chamber 19 adjacent one of the main electrodes. A thin copper sheet 79 may be positioned in the insulator plate 52 and electrically connected to the auxiliary electrodes 77, the sheet 79 being held in place by an epoxy filler 80. A similar copper sheet 81 may be mounted in the insulator plate 53. The sheet 79 provides for capacitive coupling with the sheet 71, and the sheet 81 provides for capacitive coupling with the sheet 72. The auxiliary electrodes 77, 78 serve as preionization electrodes and while preferred, are not essential. The electrode 77 is connected to the electrodes 16 by a charging resistor 82 and the electrode 78 is similarly connected by another charging resistor 83, which resistors may be embedded in the insulating plates 52, 53.

Each upstream electrode 16 preferably has a trailing section 85 which is spaced from the walls of the discharge chamber 19, and each of the downwstream electrodes 18 preferably has a leading section 86 with a similar configuration. This configuration functions to confine the electric discharge between the upstream and downstream electrodes to the space between the protruding sections 85, 86 of the electrode blades and away from the insulator plates 52, 53 forming the walls. The protruding trailing sections 85 and leading sections 86 preferably have knife edges as shown in FIG. 4. The upstream electrodes 16 desirably are uniformly spaced from each other in the array and preferably with the spacing between electrodes of the same order of magnitude as the thickness of the electrodes, as seen in FIG. 4. By way of example, in one preferred embodiment, the electrodes are 0.030 inches thick and are mounted on 0.062 inches centers providing an interelectrode spacing of 0.032 inches. The downstream electrodes 18 are similarly mounted and in the preferred embodiment, the downstream electrode array is offset from the upstream array so that the center lines of the downstream electrodes are halfway between the center lines of the upstream electrodes. This offset positioning forces the flow of discharge currents between the electrodes across the streamlines of the gas flow.

The electrode cross sections for the trailing and leading sections 85, 86 shown in FIG. 4 are suitable for a subsonic flow rate in the discharge chamber 19. An alternative cross section configuration for supersonic flow is shown in FIG. 5. The trailing section of an upstream electrode 16 expands from a uniform thickness in the region 90 to a wider point 91 providing a sonic throat between adjacent electrodes, with the electrode then tapering to a knife edge 92. The downstream electrodes 18 have a similar configuration, with the throat section normally being wider. This provides a subsonic entrance region 93, a supersonic nozzle 94 and a supersonic diffuser 95 in the flow path through the discharge chamber.

The laser described herein operates in the conventional manner for an electrically pumped gas laser, with gas being continuously moved through the discharge chamber and with the power supply providing the energy for pulse discharges between the upstream array and downstream array.

In a typical unit, the gap between the upstream and downstream electrode edges may be in the order of 2 centimeters (or three-quarters of an inch), with the discharge chamber in the order of 1 inch high and four feet long providing for about 800 electrodes per array. The leading edge of each upstream electrode may be contoured for equalization of viscous drag along the height of the electrode blades. This can be accomplished with a V-shaped notch 95, and the trailing edge of each downstream electrode may similarly be notched. These notches provide for equalizing the streamwise dimension of the blades and hence the aerodynamic drag of the individual flow channels between electrodes along the span-wise dimension of the electrodes.

The flow through electrode configuration of the present invention is especially suited for use in pulsed electrical lasers, where very rapid discharge current rise time and very high pulse repetition rates (in the order of a few hundred pulses per second and higher) are desirable. The electrode assembly provides aerodynamically clean high speed flow with electrical discharge control in the discharge chamber and also achieves a very low inductance for the electrical driving circuit. The flow velocity typically corresponds to a substantial fraction of the speed of sound of the working gas. It may even exceed the speed of sound in the supersonic operation utilizing blade cross sections of the type depicted in FIG. 5.

The electrode assembly also provides for rapid and effective removal of waste product from the discharge gap and of heat produced in the discharge gap. The closely packed electrodes with large surfaces exposed to the gas provide very effective heat transfer between the heated gas and the support structures. The heat is removed from the support structures by radiation and convection and by coolant circulating in the coolant passages.

We claim:

1. A low inductance discharge electrode assembly for an electrically pumped pulsed electrical discharge laser having an optical axis, including in combination:
   a set of blade shaped upstream electrodes;
   a set of blade shaped downstream electrodes;
   means for mounting said upstream electrodes in parallel spaced relation substantially perpendicular to said optical axis to form an upstream electrode array;
   means for mounting said downstream electrodes in parallel spaced relation substantially perpendicular to said optical axis to form a downstream electrode array;
   means for mounting said arrays on opposite sides of said optical axis with a discharge space therebetween including spaced electrical insulator plates defining opposite walls of said discharge space and providing electrical insulation between said arrays, with said upstream electrodes having trailing sections and said downstream electrodes having leading sections projecting into said discharge space toward each other and spaced from said insulator plates, with ionization occurring between said trailing and leading sections;
   means for directing a gas flow through said upstream array, said discharge space, and said downstream array including an electrically conducting upstream tube with opposing generally flat surfaces and an electrically conducting downstream tube with opposing generally flat surfaces;
   said blade shaped electrodes having a length-to-thickness ratio of at least 10 to 1, where the length is measured along the gas flow path;
   an electrical insulator overlying said tubes;
   a first electrical conducting sheet on the corresponding flat surfaces of said upstream and downstream tubes and the insulating plate therebetween;
   a second electrically conducting sheet on the flat surfaces of said upstream and downstream tubes and the insulating plate therebetween opposing said first sheet; and
   means for connecting an electrical pulse power supply across said arrays to provide electrical discharges between said upstream and downstream electrodes across said discharge space.

2. An assembly as defined in claim 1 wherein each of said upstream electrodes has a trailing knife edge and each of said downstream electrodes has a leading knife edge.

3. An assembly as defined in claim 2 wherein said upstream and downstream electrodes taper from a uniform thickness to the knife edge.

4. An assembly as defined in claim 2 wherein said upstream and downstream electrodes expand from a uniform thickness to define a throat in the flow path and then taper to the knife edge.

5. An assembly as defined in claim 2 wherein said upstream electrodes are substantially equally spaced from each other and said downstream electrodes are substantially equally spaced from each other with the same center-to-center spacing as said upstream electrodes, with the center lines of said downstream electrodes disposed halfway between the center lines of said upstream electrodes.

6. An assembly as defined in claim 1 wherein the spacing between adjacent electrodes of an array is of the same order of magnitude as the thickness of the electrodes.

7. An assembly as defined in claim 1 wherein the spacing between adjacent electrodes of an array is substantially the same as the thickness of the electrodes.

8. An assembly as defined in claim 1 wherein said tubes and insulator plates are dimensioned such that the spacing between said first and second electrical conducting sheets at said discharge space is substantially less than the spacing therebetween at said tubes.

9. An assembly as defined in claim 1 including an auxiliary electrode mounted in one of said insulator plates and projecting into said discharge space adjacent one of said electrodes.

10. An assembly as defined in claim 1 including an auxiliary electrode mounted in each of said insulator plates and projecting into said discharge space adjacent one of said electrodes.

11. An assembly as defined in claim 10 including inner and outer electrical conducting sheets on each of said insulator plates disposed parallel to said optical axis, with each outer sheet capacitively coupled to the corresponding auxiliary electrode, and means for electrically connecting said auxiliary electrodes to a high voltage source.

12. An assembly as defined in claim 1 wherein said means for mounting said electrodes includes at least one coolant flow passage therethrough substantially parallel to said optical axis.

13. An assembly as defined in claim 1 wherein each of said upstream electrodes has a generally V-notched leading edge and each of said downstream electrodes has a generally V-notched trailing edge.

* * * * *